(12) United States Patent
Singhal

(10) Patent No.: US 11,978,079 B2
(45) Date of Patent: May 7, 2024

(54) SYSTEMS AND METHODS FOR AN ELECTRONIC COUPON SYSTEM

(76) Inventor: Tara Chand Singhal, Torrance, CA (US)

( * ) Notice: Subject to any disclaimer, the term of this patent is extended or adjusted under 35 U.S.C. 154(b) by 0 days.

(21) Appl. No.: 13/549,415

(22) Filed: Jul. 14, 2012

(65) Prior Publication Data

US 2012/0310715 A1    Dec. 6, 2012

Related U.S. Application Data

(63) Continuation-in-part of application No. 12/231,618, filed on Sep. 4, 2008.

(51) Int. Cl.
```
G06Q 30/0211      (2023.01)
G06Q 30/02        (2023.01)
G06Q 30/0207      (2023.01)
G06Q 30/0251      (2023.01)
```

(52) U.S. Cl.
CPC ......... *G06Q 30/0211* (2013.01); *G06Q 30/02* (2013.01); *G06Q 30/0207* (2013.01); *G06Q 30/0267* (2013.01)

(58) Field of Classification Search
CPC .......................... G06Q 30/02; G06Q 30/0267
USPC ................................. 705/14.1, 14.38, 14.39
See application file for complete search history.

(56) References Cited

U.S. PATENT DOCUMENTS

| | | |
|---|---|---|
| 2002/0010627 A1 | 1/2002 | Lerat |
| 2002/0091569 A1 | 7/2002 | Kitaura |
| 2005/0131761 A1 | 6/2005 | Trika |
| 2005/0198095 A1* | 9/2005 | Du et al. .......... 709/200 |
| 2006/0169772 A1* | 8/2006 | Page ............. G06Q 30/08 235/383 |
| 2007/0150339 A1 | 6/2007 | Retter |
| 2007/0174116 A1* | 7/2007 | Keith ........ G06Q 30/0267 705/14.23 |
| 2007/0288313 A1* | 12/2007 | Brodson ..... G06Q 30/0215 705/14.17 |
| 2008/0208688 A1 | 8/2008 | Byerley |

(Continued)

FOREIGN PATENT DOCUMENTS

| | | |
|---|---|---|
| CA | 2741437 A1 | 2/2018 |
| WO | 2009073635 A1 | 6/2009 |

OTHER PUBLICATIONS

Candard, Sebastian, "multi coupon system," Springer (online) 2006, retrieved from internet Apr. 27, 2022.

(Continued)

*Primary Examiner* — Mario C. Iosif
(74) *Attorney, Agent, or Firm* — Aldo Noto; RIMON PC

(57) ABSTRACT

A coupon delivery and redemption system provides, (i) for wireless delivery of a product coupon file with the coupons of the product merchants to customers' wireless mobile devices from a coupon system anywhere, at home or in store while shopping, (ii) for customer to search and select for display a product coupon from the coupon file, (iii) for coupon redemptions by retail merchants by scanning the coupon bar code from the wireless device screen, (iv) for validation of the coupon for one time use by interfacing of the retail merchant system with the coupon system, (iv) for the product merchant to receive coupon redemption data from the coupon system, and (v) for the retail merchant to receive aggregate funds for redeemed coupons via the coupon system for an efficient and convenient paperless coupon system.

20 Claims, 12 Drawing Sheets

(56) References Cited

U.S. PATENT DOCUMENTS

| | | | | |
|---|---|---|---|---|
| 2009/0259535 A1* | 10/2009 | Chow | ............... | G06Q 30/0239 |
| | | | | 705/14.39 |
| 2011/0078009 A1* | 3/2011 | Macaluso | ........... | G06Q 30/0224 |
| | | | | 705/14.25 |
| 2011/0131077 A1* | 6/2011 | Tan | ........................ | G06Q 30/02 |
| | | | | 705/347 |
| 2011/0159857 A1* | 6/2011 | Faith | ................... | H04L 63/0861 |
| | | | | 455/414.3 |
| 2011/0184809 A1* | 7/2011 | Beavers | ................ | G06Q 30/02 |
| | | | | 705/14.64 |
| 2012/0136698 A1* | 5/2012 | Kent | .................... | G06Q 20/387 |
| | | | | 705/14.1 |
| 2012/0215611 A1* | 8/2012 | Korson | ............. | G06Q 30/0222 |
| | | | | 705/14.23 |
| 2013/0024267 A1* | 1/2013 | Libenson | ............... | G06Q 30/02 |
| | | | | 705/14.38 |

OTHER PUBLICATIONS

Banerjee, "enhance mobile coupon," Research in Int Marketing, 2009, retrieved from internet Sep. 9, 2022.
Chang, Chin-Chen, "a secure e-coupon system for mobile users," p. 276, http:citeseerx.ist.psu.edu/viewdoc/2006.
Office Action dated Dec. 17, 2020 in U.S. Appl. No. 12/231,618.
Office Action dated Aug. 23, 2021 in U.S. Appl. No. 12/231,618.
Office Action dated May 4, 2022 in U.S. Appl. No. 12/231,618.
Office Action dated Oct. 6, 2022 in U.S. Appl. No. 12/231,618.
Office Action dated Jul. 15, 2020.

\* cited by examiner

At step 100, linking to a coupon server and being presented categories of coupons and selecting a category.

At step 102, providing customer mobile device number enabling the coupon system creating a personalized coupon file.

At step 104, embedding in the scannable coupon code, sub-codes for a device subscriber id, the merchant id, the amount, the expire date, the product id, and a serial number.

At step 106, receiving and locally storing, in a mobile wireless device, a file with a plurality of merchant coupons, each coupon formatted with fields of a merchant id, an amount, an expire date, a product identification, and a coupon bar code.

At step 108, searching and selecting a coupon by a customer and displaying the selected coupon on the device screen, enabling the coupon bar code to be scanned by a retail merchant scanner.

At step 110, scanning and enabling the retail merchant to process the coupon by the coupon bar code.

At step 112, interfacing between retail merchant system and the coupon server, validating the coupon code in real time, preventing a coupon code from being used twice from the wireless device.

At step 114, tracking by the coupon server the coupons that have been used by device subscriber and not sending by the server the same coupons to the device owner in a time period.

At step 116, displaying a coupon number, on customer request that can be entered in an online merchant web page.

Figure 6

Coupon Server Logic 172:

1. Receive search query with product code
2. Search coupon database
3. Organize search results by specific product, competing products, and best value coupon
4. Send results
5. Create coupon activity records
6. Create statistical data charts

Figure 10B

Coupon Function Logic 170:

1. Activate coupon function
2. Receive product code
3. Send search query
4. Receive search response
5. Display organized response

Figure 10A

At step 185, having a coupon server with a database server and maintaining by the database server a coupon database organized by (i) product codes and for each product a list of available coupons, and (ii) competing products and for each such product a list of available coupons.

At step 186, enabling using a mobile wireless device equipped with a reader element and reading product codes from product packages in a retail store and receiving the product code in a coupon function operative in the device and storing the product code in a temporary memory of the device.

At step 187, forming automatically one of a plurality of search queries for a product coupon for the specific product code, by the coupon function, without further user interaction and wirelessly sending the query with the product code to the coupon server accessible on the global computer network.

At step 188, receiving by the server a coupon search query from only a mobile wireless device, for a specific product code and searching the coupon database and finding available coupons by product code and sending to the wireless device, thereby the system providing a one-step user interface to the coupon system.

At step 189, receiving by the coupon function then, in return response from the coupon server including any available coupons for the product and any coupons of competing products.

At step 190, displaying by the coupon function them on the device screen, thereby, the coupon function automatically providing for the user an efficient one step interface for access, search, and delivery of coupons by product code to the user wireless mobile device from the coupon server.

At step 191, organizing by the coupon function the display of the received coupons in the device in the sequence of specific product coupon, competing product coupon, and best value coupon.

At step 192, displaying by the coupon function for each coupon, a relative consumer ranking of each competing product next to the coupon data, the ranking received along with the coupon data from the coupon server, enabling a user to judge the relative value of a competing product coupon.

At step 193, comparing by a best value coupon logic coupon data from competing products and organizing coupons by specific product coupon and relative ranking, up to four competing product coupons and their relative ranking, and best value coupon among these coupons.

At step 194, creating a record by a server logic for each search query and response for use in creating a statistical chart for analysis by product codes and creating by the server logic periodic statistical data charts by product code for delivery to businesses.

Figure 12

SYSTEMS AND METHODS FOR AN ELECTRONIC COUPON SYSTEM

CROSS REFERENCE

This application is a continuation in part (CIP) of application Ser. No. 12/231,618, filed Sep. 4, 2008, titled "Systems and methods for an electronic coupon system" of Tara Chand Singhal. The contents of application Ser. No. 12/231,618 are incorporated herein by reference.

FIELD OF THE INVENTION

The preferred embodiment is on systems and methods for an electronic coupon system that (i) enables electronic coupons to be received on a mobile wireless phone from a coupon system server, (ii) presented to retail merchants via scan of the coupon bar code on the mobile phone screen, and (iii) processed electronically between the retail merchants and the product merchants via the coupon system server.

BACKGROUND

Coupons form an important form of advertising in the economy to influence the customer to purchase products. The product merchants plan coupon based advertising campaigns by printing coupons and by delivering such coupons to customers by various means, such as, mail, and print media.

To be able to use such coupons, the consumer or customer clips and takes the coupons to the retail merchants that stock the products. The retail merchant accepts the coupon based on redemption limitations identified on the coupon for the specific products identified on the coupon and the retail merchant charges a discounted price for the products based on the coupon amount. The retail merchants then process these coupons and collect the coupon funds along with a coupon processing administrative fee by submitting the paper coupons to the respective product merchants.

It is an objective of the preferred embodiment to provide for a more efficient paperless coupon collection and redemption system for the consumers.

It is yet another objective of the preferred embodiment to provide for a more convenient, versatile and automated coupon delivery and redemption system for the product merchants.

It is yet another objective of the preferred embodiment to provide for a more efficient and convenient paperless redemption system for the retail merchants.

SUMMARY

An electronic coupon system for delivery of product coupons of product merchants to customers and redemption by retail merchant system is described.

The coupon system has a coupon system server with interface to a wireless mobile device of the customer. On customer request from anywhere, such as at home or while shopping, the coupon system sends customized coupon files to wireless mobile receivers of customers, when the mobile device is identified by a wireless mobile identifier. The customer may select from categories of coupons in the coupon system based on shopping categories.

The wireless device has a coupon function that receives and locally stores in the device a coupon file with a plurality of merchant coupons. Each coupon may be formatted with fields of, a product merchant id, a coupon amount, an expiration date, a product's identification, redemption limitations, and a coupon bar code. The coupon function in the wireless device enables the customer to search and select a product coupon from the coupon file and display the selected coupon on the mobile wireless device screen, enabling the coupon bar code to be scanned by a retail merchant scanner.

After scanning the coupon bar code, the retail merchant system interfaces with the coupon system in real time for validating the coupon code and preventing a coupon code from being used twice from the wireless device.

The coupon system tracks the coupons that have been used by wireless device identifier and may prevent the coupon system from sending the same coupons to the same wireless mobile device in a time period.

The coupon system also tracks the coupons that have been redeemed and provides accounting to the product merchant system via the product merchant interface to the coupon system. The coupon system has an interface with product merchants for account management and entering coupons data, receiving coupon redemption data, and transferring coupon redemption funds from the product merchant system to the retail merchant system.

The product merchant interface to the coupon system is facilitated via a web interface that enables (i) planning a coupon based advertising campaign, (ii) creating and entering product coupons, each coupon identified by fields of, product id, coupon amount, redemption limitations, and coupon expiration date into the coupon system. Also the product merchant interface provides a web interface that enables receiving coupon redemption data and paying for the coupons, that have been redeemed, to the retail merchant.

BRIEF DESCRIPTION OF THE DRAWINGS

Some of the novel features of this invention will be best understood from the accompanying drawings, taken in conjunction with the accompanying description, in which similar reference characters refer to similar parts, and in which:

FIG. 6 is a method diagram that illustrates features of the present invention of electronic coupon system.

FIG. 10A is a process flow block diagrams that illustrates features of the present invention of coupon function in wireless device of the electronic coupon system.

FIG. 10B is a process flow block diagrams that illustrates features of the present invention of the coupon serve logic in the coupon server of the electronic coupon system.

FIG. 12 is a method diagram that illustrates features of the present invention of coupon interface embodiment to the electronic coupon system.

DESCRIPTION

Figure 1:
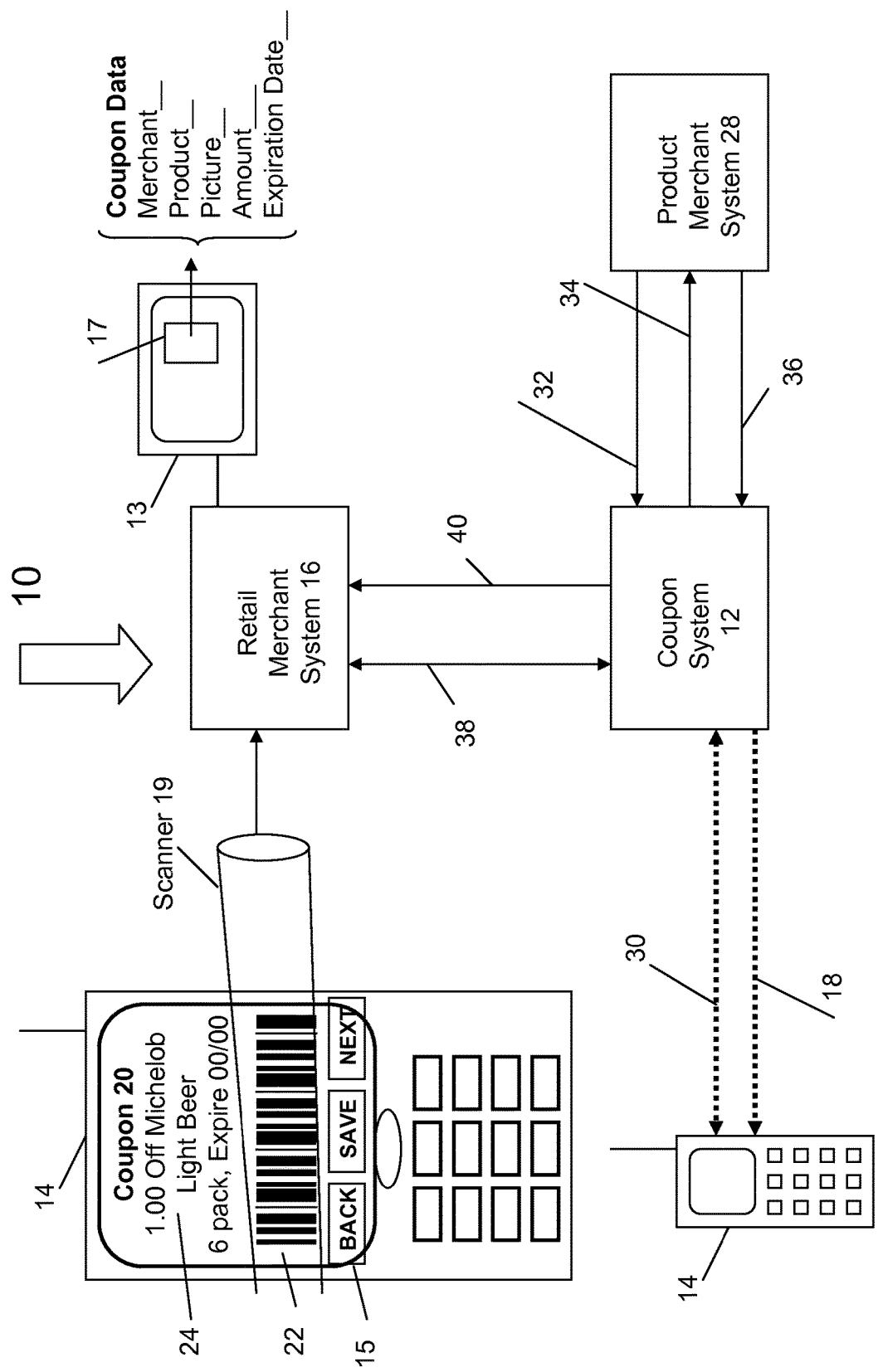
FIG. 1 is a block diagram that illustrates features of the present invention of electronic coupon system.

With reference to FIG. 1, an electronic coupon system 10 for delivery of product coupons 20 of product merchants 28 to customers with wireless devices 14 and redemption by retail merchant system 16 is facilitated by a coupon system 12.

The coupon system is able to send customized coupon files 18 to wireless mobile receivers 14 of customer, on customer request 30 when the mobile device is identified by a wireless device identifier to the coupon system 12.

The wireless device 14 is able to scroll 15 the coupon file 18 displaying coupons 20 in the device 14. The coupon 20 on the wireless device 14 is selected and displayed with product description and redemption limitations 24 and a coupon bar code 22. The product description 24 may also include a product picture. The coupon bar code 22 is scanned by a retail merchant scanner 19 that is interfaced to the retail merchant system 16.

The retail merchant system 16 has an interface 38 with the coupon system 12 for validating the coupon code 22 in real time and preventing a coupon code from being used twice from the same wireless device 14. The retail merchant system 16 has a display terminal 13 that may display a coupon window 17 identifying the coupon data that is received from the coupon system 12.

The coupon system 12 has an interface 32 with the product merchant system 28 for account management and receiving coupon data, an interface 34 for sending coupon redemption data to the product merchant 28, an interface 36 for receiving coupon redemption funds from the product merchant system 28, and an interface 40 for transferring the coupon redemption funds to the retail merchant system 16.

Figure 2:
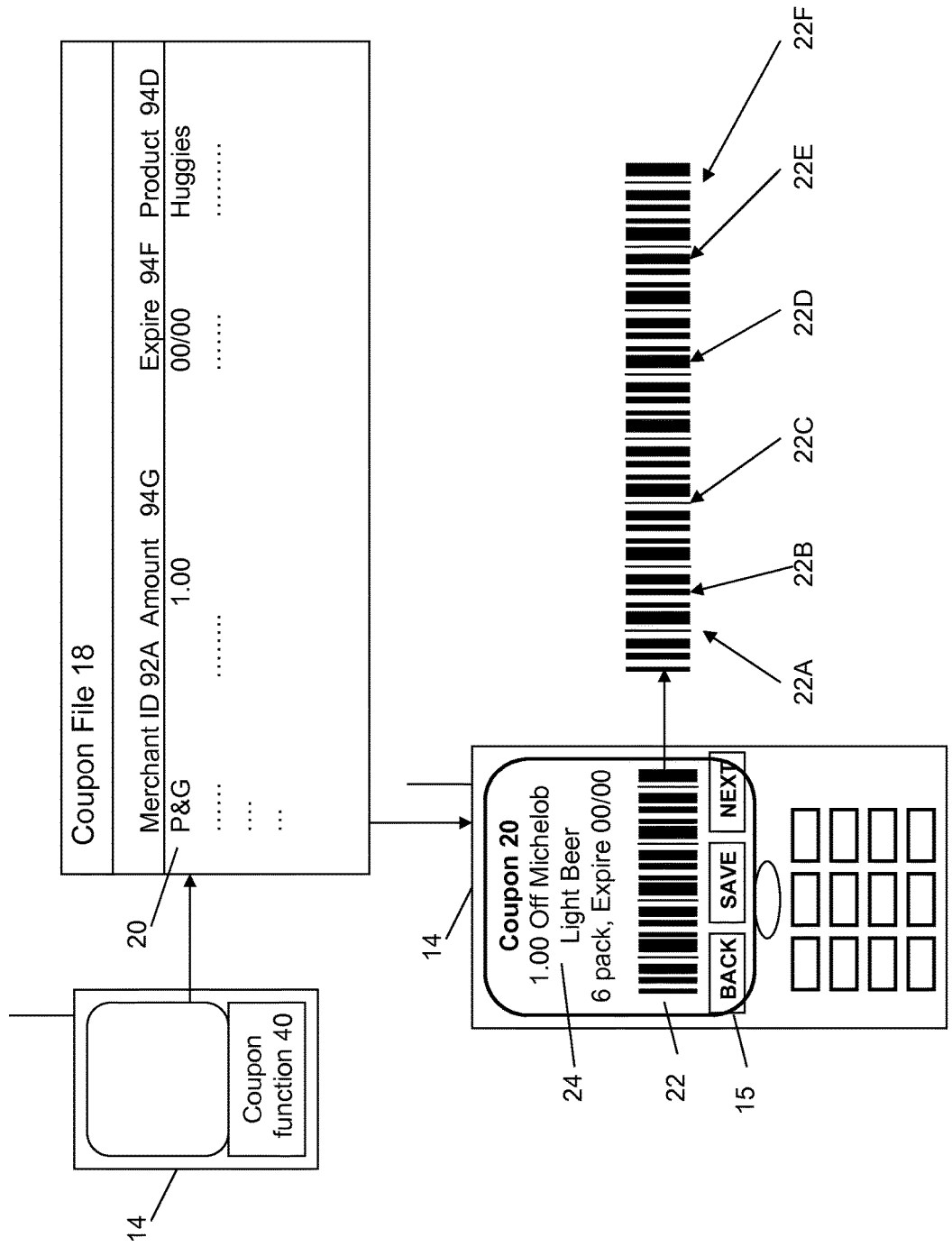
FIG. 2 is a block diagram that illustrates features of the present invention of coupon function in the wireless device.

The coupon system 12 tracks the coupons that have been redeemed by the retail merchant 16 when the retail merchant validates the coupon bar code 22 with the coupon system 12 via interface 38. The coupon system 12 provides a periodic or on demand accounting to the product merchant system 28 of the redeemed coupons via the product merchant interface 34. The coupon system 12 tracks the coupons that have been used by wireless device identifier 22A, as illustrated in FIG. 2 and prevents the coupon system 12 from sending the same coupons to the same device 14 owner in a time period.

The scannable coupon code 22 may embed sub-codes for, mobile device id, merchant id, amount, expire date, product id, and serial number. The bar code enables the retail merchant to process the coupon by the coupon code with the coupon system 12.

An interface 38 between retail merchant system and the coupon server 12 validates the coupon code in real time and prevents a coupon code from the wireless device from being used twice.

The coupon server 12 tracks the coupons that have been used by device subscriber 22A and the server does not send the same coupons to the device owner 14 in a time period.

With reference to FIG. 2, the wireless device 14 has been adapted with a coupon function 40 that receives and locally stores in the device 14 a coupon file 18 with a plurality of merchant coupons 20. Each coupon file may be formatted with fields of, a product merchant id 92A, a coupon amount 94G, an expiration date 94F, a product identification 94D, and a coupon bar code 22. There may be additional fields not specified herein. The coupon function 40 enables the customer to search and select, via scroll function 15, the coupon file 18 and display the selected coupon 20 on the device screen with product description 24, and coupon bar code 22, enabling the coupon bar code 22 to be scanned by a retail merchant scanner.

The coupon bar code 22 may embed sub-codes for, a wireless device identifier 22A, product category or class 22B, the product merchant id 22C, the coupon id 22D, the coupon amount 22F, and the coupon expire date 22E, enabling the retail merchant system 16 to process the coupon 20 by the coupon bar code 22. The wireless device identifier 22A may be the telephone number that is assigned by the telephone company.

Mobile devices 14 have screens that are large enough to display such a coupon bar code. Alternatively, the coupon bar code may be a serial number that matches with the coupon id and the related coupon data in the coupon system 12.

Figure 3B:
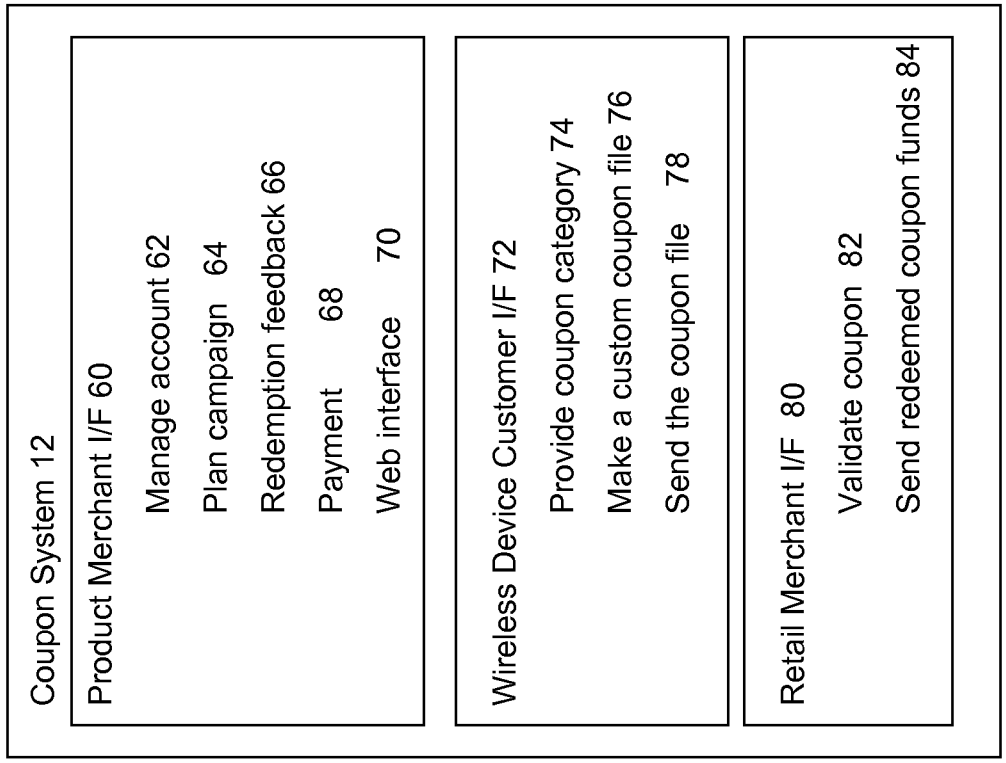
FIG. 3B is a block diagram that illustrates features of the present invention of coupon system function in the coupon server.
Figure 3A:
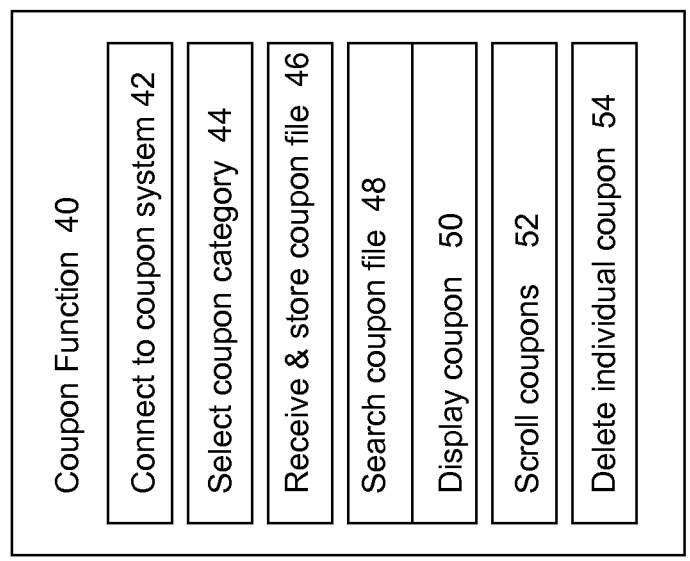
FIG. 3A is a block diagram that illustrates features of the present invention of coupon function in the wireless device.

With respect to FIG. 3A, the coupon function 40 in the mobile wireless device 14 has means to connect to the coupon system 42; means to select coupon category 44 from a list of such categories; means to receive and locally store 46 in the mobile wireless device 14 a coupon file with a plurality of merchant coupons, each coupon formatted with fields of a merchant id, a coupon amount, an expiration date, a product identification, and a coupon bar code; means to search and select a product coupon 48; means to display a selected coupon on the device screen 50 that enables the coupon bar code to be scanned by a retail merchant scanner; and means to scroll the coupon file 52; and means to delete individual coupons 54. When the coupon function is activated, it may also automatically delete coupons that have expired. The coupon function 40 may be activated in the device 12 by means of a function key (not shown)

The coupon function 40 has means to link to the coupon system 12 and then is presented categories of coupons with means to select a category and means to provide customer wireless mobile identifier in the form of telephone number, and means for receiving into a mobile device, a personalized coupon file. The coupons in the coupon file are customized to a particular wireless device by the customer wireless mobile number, as illustrated in FIG. 2, by embedding the wireless device id 22A into the coupon bar code 22

The coupon function 40 has means to display on request a coupon number (not shown) that corresponds to the coupon bar code 22, for the coupon number to be entered in an online merchant web page (not shown).

The wireless device 14 is a prior art device that has been adapted with the coupon function 40 features as described above. The technology itself underlying the coupon function 40, as described above is based on programming the device 14 with a coupon function applications with features as described above and is prior art and no specific claim is made for such technology.

With reference to FIG. 3B, the coupon system 12 has a product merchant system interface 60 that provides for managing a merchant account 62; planning and managing a coupon based advertising campaign 64; coupon redemption data feedback 66; a payment system 68 for collecting payment for redeemed coupons from the product merchant, and a web interface 70 that facilitates the product merchant interface.

Also, with reference to FIG. 3B, the coupon system 12 has a customer wireless device interface 72 that provides for, displaying coupon categories 74, receive mobile id and create a custom coupon file 76; and to send the coupon file 78 to the wireless device 14 of the customer.

Also with reference to FIG. 3B, the coupon system 12 has a retail merchant system interface 80 that provides for validating the coupon in real time 82 and periodically sending coupon redeemed funds to the retail merchant system by electronic fund transfer 84.

Figure 4:
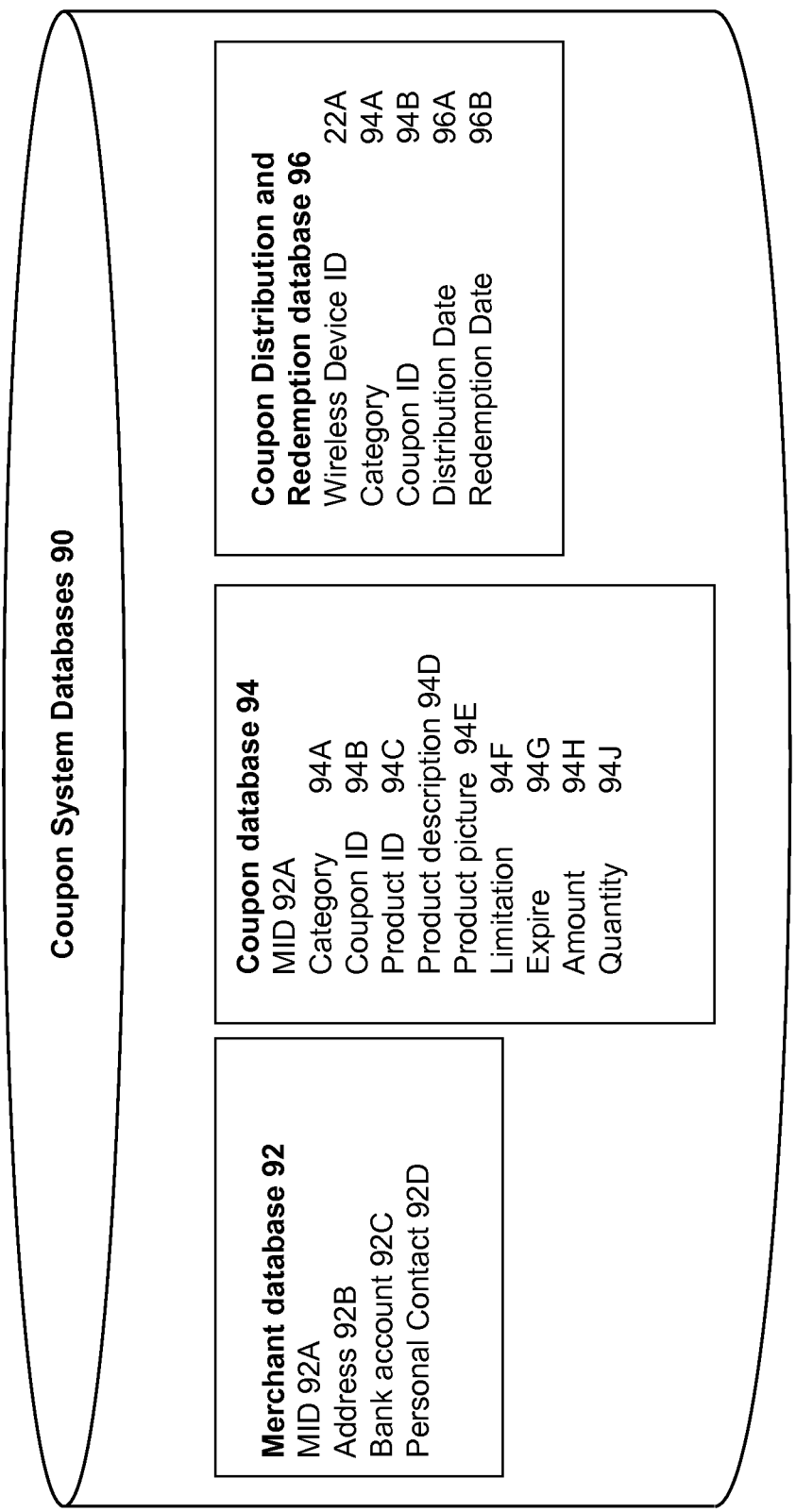
FIG. 4 is a block diagram that illustrates features of the databases of the present invention of electronic coupon system.

With reference to FIG. 4, the coupon system 12 has databases 90 that support the coupon system functions, as illustrated in FIG. 3B, of product merchant interface 60, customer wireless device interface 72 and retail merchant interface 80.

The product merchant database 92 has fields for merchant id 92A, merchant address 92B, bank account information 92C that may be used for electronic transfer of redeemed coupon funds, and personal contact information 92D.

The coupon database 94 has fields for merchant id 92A, coupon category 94A, coupon id 94C, product id 94C, product information 94D, product picture 94E, coupon limitation 94E, coupon expiration 94G, coupon amount 94H and coupon quantity 94J.

The coupon distribution and redemption database 96 has fields for wireless device id 22A, coupon category 94A, coupon id 94B, distribution date 96A and redemption date 96B.

Figure 5:
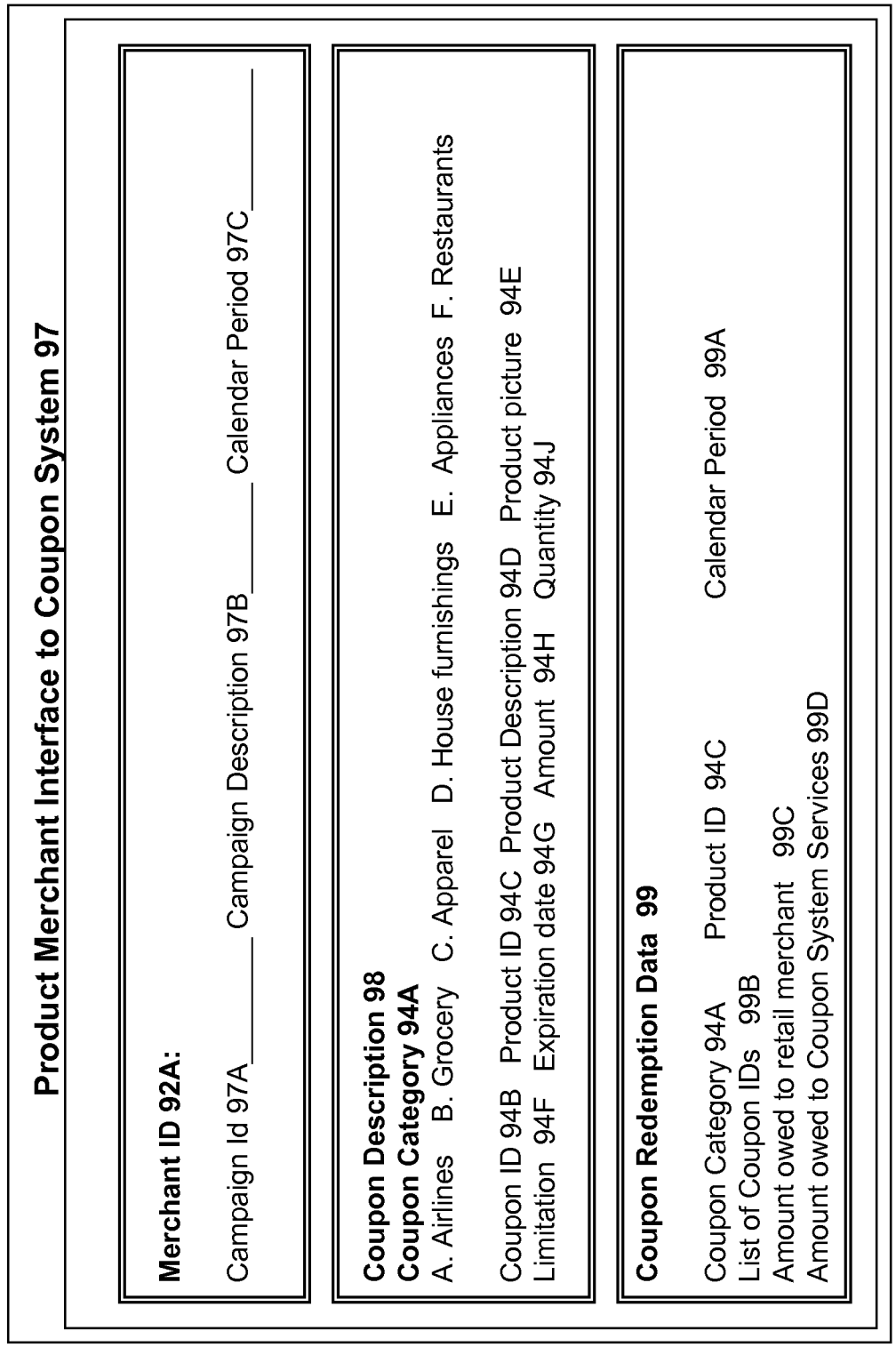
FIG. 5 is a block diagram that illustrates features of the web interface of Product Merchant to Coupon system.

As illustrated in FIG. 5, the product merchant interface 97 to coupon system 12 has a web interface that enables planning a coupon based advertising campaign with fields that support planning such as campaign id 97A, campaign description 97B and calendar period 97C.

The web interface 97 also enables creating and entering in the coupon system 12, the coupon description 98. The coupon description 98 provide for coupon category 94A such as airlines, groceries, apparel, house furnishings, appliances and restaurants among many others.

Each product coupon may be identified by fields of, coupon id 94B, product id 94C, product description 94D, product picture 94E, coupon redemption limitation 94F, coupon expiration date 94G, coupon amount 94H. A coupon quantity 94J is also provided for the product merchant to define the quantity of coupons in this coupon based advertising campaign. The quantity 94J may be entered in numbers that are multiples of 1000.

Also the product merchant interface 97 provides a web interface that enables receiving coupon redemption data 99 by fields of coupon category 94A, product id 94C, calendar period 99A, and list of redeemed coupon ids. 99B. Also provided to the product merchant is the amount owed to the merchants 99C based on redeemed coupons, and also the amount owed to the coupon system for coupon services 99D.

As a source of revenue to the coupon system 12, the coupon system charges a fee to the product merchants for coupon delivery and coupon redemption services. Typically the retail merchant charges a coupon administrative fee to the product merchants for redeeming and processing their paper coupons. In the automated paperless coupon system 12, a coupon administration fee is charged from the product merchants. This fee may be in lieu of the fee charged by the retail merchants. As a simplified illustration, the coupon system 12 may charge a service fee per coupon that is made of two parts, one part is for the coupon delivery to the wireless device and the second part fee may be for those coupons that are actually redeemed by the wireless device owner.

As an added service to the product merchants, a statistical coupon redemption information such as coupon redemption over time and geographical region may also be provided in form of graphs to assist the product merchants to refine their coupon based advertising campaigns.

The coupon system 12 has multiple servers with memory and storage, with interfaces to the Internet, capable of high speed processing and database searches of relational database management system that supports the databases as described above. A web server supports the web interface and other support software supports the interfaces to the wireless device 12, interfaces to the retail merchant 16 for validating coupons in real time and interfaces to the product merchant 28. The coupon system 12 hardware and support software is prior art except the coupon system application that is hosted on the hardware with the help of prior art support software.

With reference to FIG. 6, a method for delivery for electronic coupons 20 to customer's wireless device 14 and redemption of coupons by retail merchants 16 has the following steps. Not all the steps may be used or used in the order specified:

At step 100, linking to a coupon system by a customer wireless device and being presented categories of coupons and selecting a category.

At step 102, providing customer mobile device number to the coupon system, enabling the coupon system to create a personalized coupon file.

At step 104, embedding in the scannable coupon code, sub-codes for a device subscriber id, the merchant id, the amount, the expiration date, the product id, and a serial number.

At step 106, receiving and locally storing, in the mobile wireless device, a file with a plurality of merchant coupons, each coupon formatted with fields of a merchant id, an amount, an expire date, a product identification, and a coupon bar code.

At step 108, searching and selecting a coupon by a customer and displaying the selected coupon on the device screen, enabling the coupon bar code to be scanned by a retail merchant scanner.

At step 110, scanning and enabling the retail merchant to process the coupon by the coupon bar code.

At step 112, interfacing between retail merchant system and the coupon server, validating the coupon code in real time, preventing a coupon code from being used twice from the wireless device.

At step 114, tracking by the coupon server the coupons that have been used by device subscriber and not sending by the server the same coupons to the device owner in a time period.

At step 116, displaying a coupon number that can be entered into an online-merchant's web page.

Alternative Customer Interface Embodiment to the Electronic Coupon System

The terms user, customer and shopper have been used interchangeably in the following description. The user/customer interface embodiment using a wireless mobile device to access and retrieve electronic coupons into the wireless mobile device, as had been described earlier, requires the user to search a coupon database based on product categories and sub-categories from his mobile device. This type of user/customer interface is suitable when a shopper is either shopping in the retail store or planning a shopping trip and wants to find out what coupons are available for the items the customer has on his/her shopping list.

However, when a shopper is interested in finding available coupons for a few items or a single item, a better user experience is desirable that can quickly find that information without having to navigate through many layers of search screens. This alternative user interface embodiment described herein enables an efficient one-step search of available coupons in the coupon system based on the product's ISU code that is bar coded on every product, a product that a user is interested in purchasing at a retail store.

Which one of these interfaces is best suited to a person's shopping habits would be decided by the shopper. A shopper may use one or the other or both interfaces to the electronic coupon system as appropriate. FIGS. 7 to 12 illustrate this alternative user/customer interface embodiment to the electronic coupon system.

Figure 7:
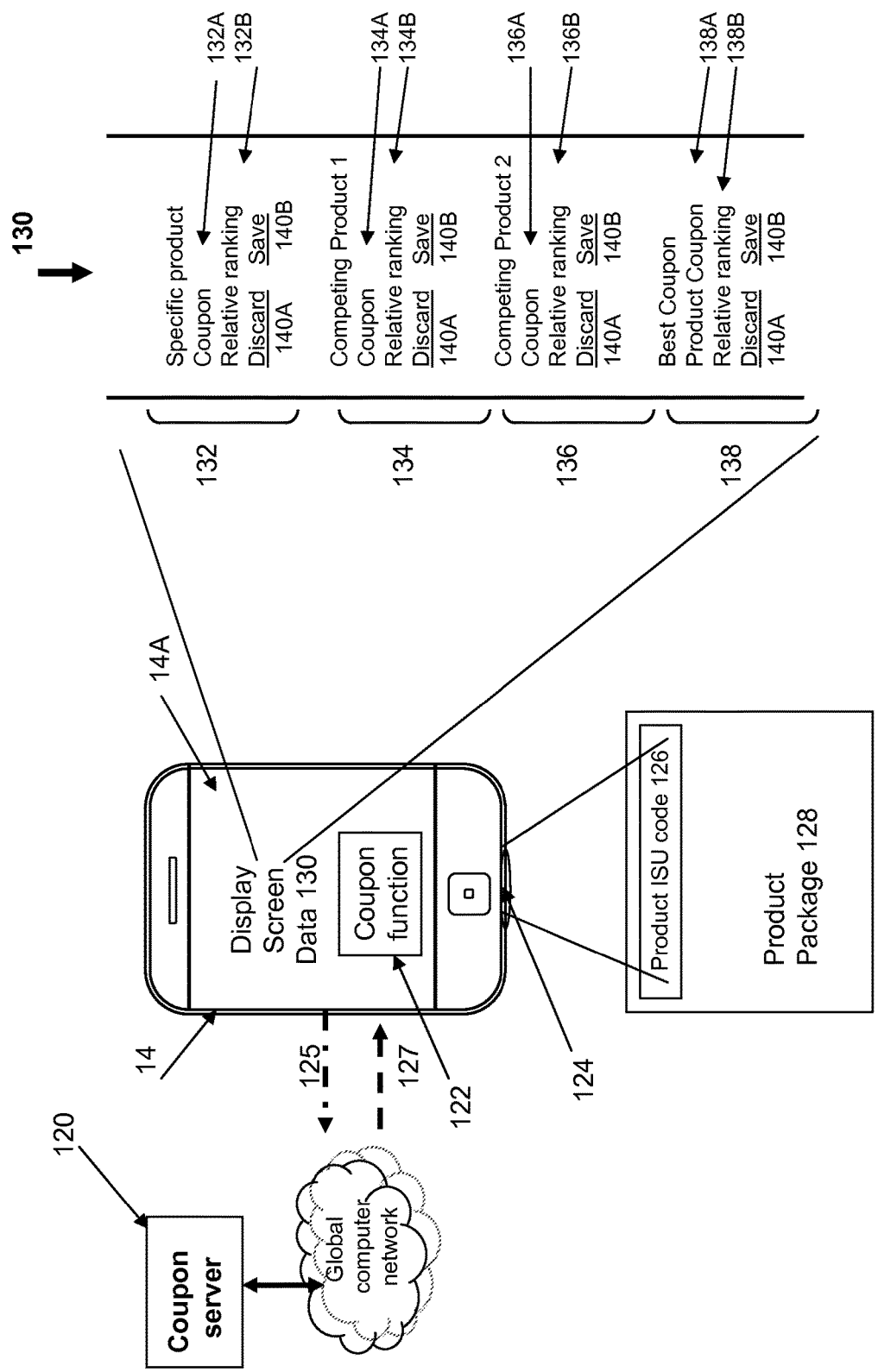
FIG. 7 is a block diagram that illustrates features of the present invention of electronic coupon system using a wireless mobile device.

FIG. 7 illustrates the features of the embodiment that uses a mobile wireless device 14 of the customer that is equipped with a reading element 124 to be able to read product codes 126 from products 128 and display on display screen 14A all available coupons data 130 for a specific product.

The reading element 124 is a prior art technology and may use a camera coupled with software to optically scan the product bar code and convert to a numerical product code value. Alternatively the reading element may also be a miniature version of a bar code scanner designed to be used with cell phones. Almost all cell phones now come equipped with a camera and may be adapted with a bar code scanner function.

The device 14 scans the bar code 126 on product 128 and wirelessly sends record 125 via the global computer network to the coupon server 120. The coupon server 120 returns a record 127 to the device 14 that contains coupon data 130 that is displayed on the device screen 14A of device 14.

The coupon data 130 has coupon data 132 for the specific product, coupon data 134 for a competing product, coupon data 136 for another competing product, and best value coupon data 138 for the best value coupon product. Each of these coupon data displays for product 132, the coupon data 132A and a relative ranking 132B, for product 134, coupon data 134A and relative ranking 134B, for product 136, coupon data 136A and relative ranking 136B, and for product 138, best value coupon data 138A and relative ranking 138B.

Further each of these coupon data displays have a Discard 140A and Save 140B action buttons to either discard the coupon or save the coupon in the memory of the device 14 for later use for redemption with a retail merchant.

Thus coupon data display 130 provides a comprehensive display of all available data to enable the customer to make the best value judgment. A customer not only can learn what coupons if any are offered for a specific product but also what coupons are being offered for competing products. The electronic coupon system provides further guidance as to which would be the best choice among all these competing product offerings by displaying a best value coupon. The best value coupon determination is calculated using a number of criterions by the coupon server as has been described later with the help of FIGS. 9 and 11.

Figure 8:
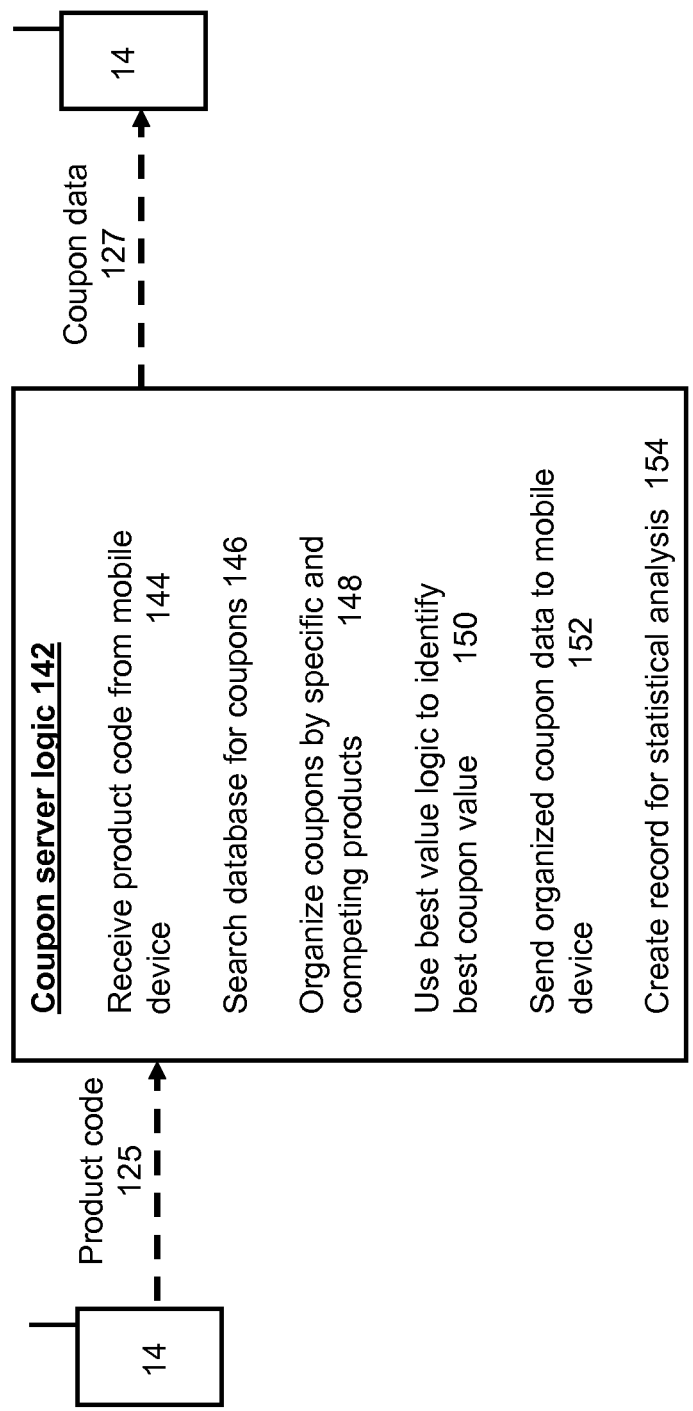
FIG. 8 is a block diagram that illustrates features of the present invention of coupon server logic of the electronic coupon system.

FIG. 8 illustrates coupon server logic 142 that is present in the coupon server 120. The logic 142 receives a product code record 125 from the device 14 and outputs the coupon data display record 127 to the device 14. The logic 142 has the functions of, (i) receive product code from mobile device 144, (ii) search database for coupons 146, (iii) organize coupons by specific and competing products 148, (iv) use best value logic to identify best coupon value 150, (v) send organized coupon data to mobile device 152, and (vi) create record for statistical analysis 154.

Figure 9:
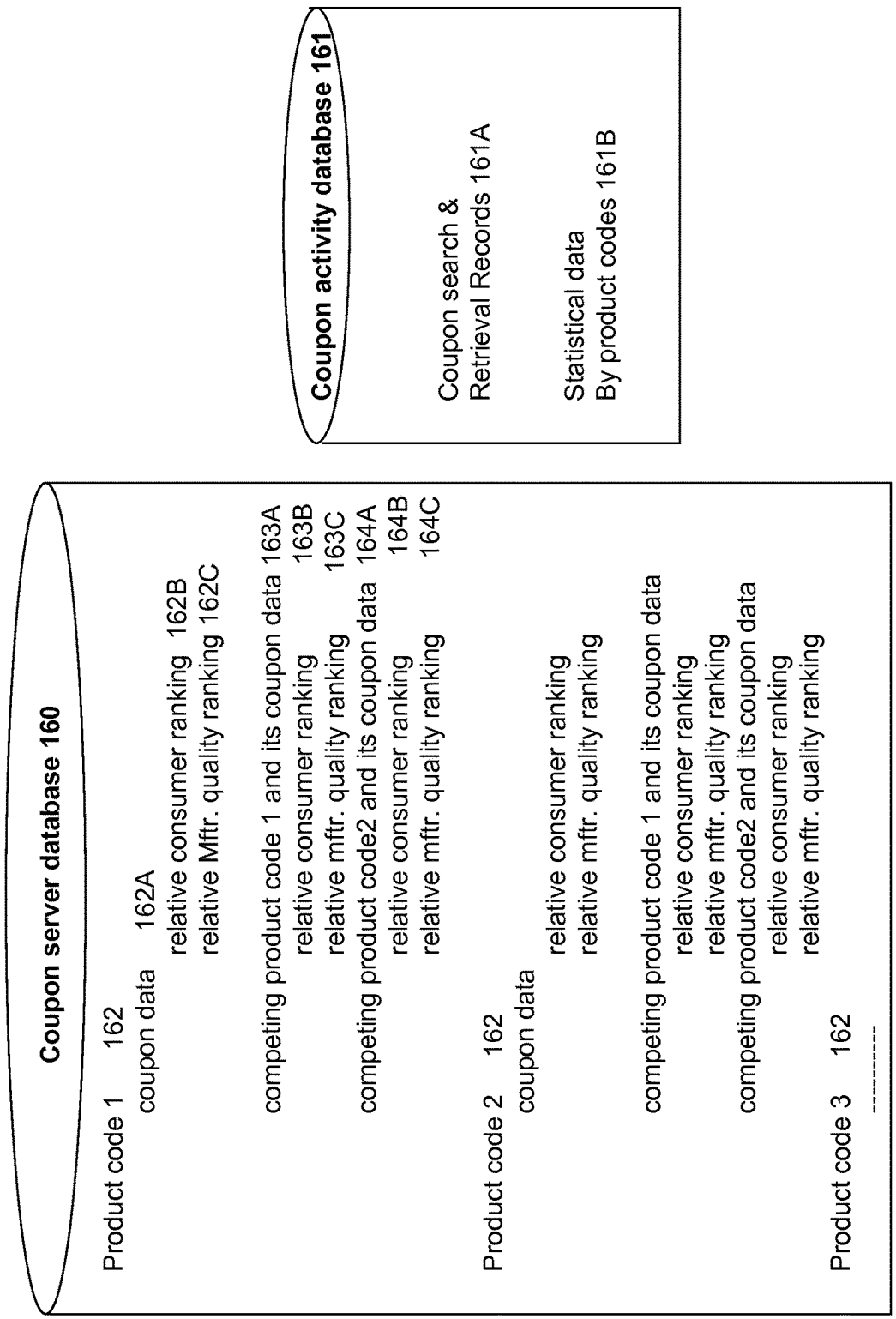
FIG. 9 is a block diagram that illustrates features of the present invention of coupon server database of the electronic coupon system.

FIG. 9 illustrates coupon server databases 160 and coupon activity database 161. Database 160 stores coupon data organized by product code 162. For each product code 162, the data stored is coupon data 162A, relative consumer ranking 162B, relative manufacturing quality ranking 162C, and for this product, a number of competing products. Two competing products 163 and 164 are shown for illustration and for each competing product similar data 163A, B and C and 164A, B and C is stored. Since the database is organized by product code, for each product code the database also identifies a number of competing products. Therefore it is highly likely that the products that are listed as competing products may also be listed via their product code 162 and that would enable a shopper to search for coupons for any product via the product code and get all available coupon data.

Database 161 stores data 161A that is related to coupon search and retrieval by the customer wireless devices. Database 161 also stores data 161B that is statistical compilation of the data in database 161A.

The data is statistically organized by product codes and their coupon activity to give both the coupon creator and the system manager information about the frequency of coupon accesses and their redemptions in real time on a daily, weekly, monthly basis to fine tune the system as well as the availability of the coupons to satisfy the customer and shopper needs while at the same time maximizing retail sale of the products.

FIG. 10A illustrates the logic functions of a coupon function 170 operative in a mobile wireless device 14. The sub-functions of a coupon function are: (i) activate coupon function, (ii) receive product code, (iii) send search query, (iv) receive search response, and (v) display organized coupon display response.

FIG. 10B illustrates logic functions of a coupon server logic 172 operative in the coupon server 120. These sub-functions are: (i) receive search query with product code, (ii) search coupon database, (iii) organize search results by specific product, competing products, and best value coupon product, (iv) send search results to device 14A, and (v) create coupon activity records, and (vi) create statistical data charts.

Figure 11:
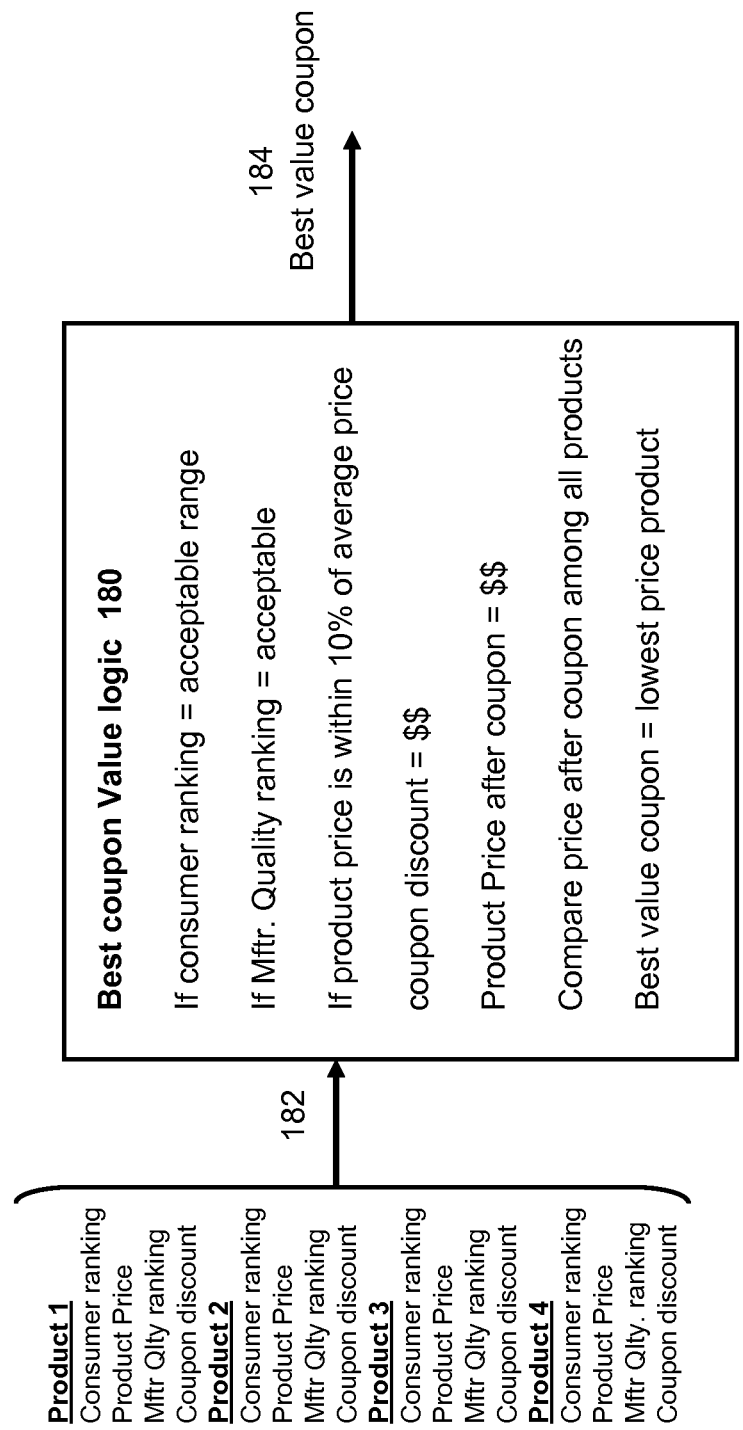
FIG. 11 is a block diagram that illustrates features of the present invention of best value coupon logic of the electronic coupon system.

FIG. 11 illustrates a simplified illustration of best coupon value logic 180. The logic 180 receives data 182 from database 160 on different competing products. The data on each product includes consumer ranking, product price, manufacture quality ranking and coupon discount. The logic 180 as shown in the simplified illustration computes the best value coupon among these competing products. In the logic 180, If consumer ranking=acceptable range AND If Mftr. quality ranking=acceptable AND If product price is within 10% of average price AND coupon discount=$$, Product Price after coupon=$$, compare price after coupon among all products to determine best value coupon as one with the lowest price product. The logic 180 outputs the best value coupon data 184

The parameter of consumer ranking may be available in prior art or may be arrived at by market surveys. The parameter of manufacture quality ranking may be based on the reputation of the brand and if no brand or store brand on the reputation and quality record of the manufacture for adhering to manufacturing standards.

A system for a product coupon access by a retail customer from a coupon server on a global computer network has a mobile wireless device of the customer that is equipped with a reader to read product codes from products in a retail store.

There is a coupon function in the device, operative in the device, the function when customer activated in the device, receives a product code read from a product, stores the specific product code in a temporary memory of the device.

The coupon function without further customer interaction automatically forms one of a plurality of search queries for a product coupon for the specific product code and wirelessly sends the query with the product code to a coupon server accessible on the global computer network to search for and retrieve any available coupons for the specific product.

The coupon function then receives in return response from the coupon server to include any available coupons for the product and any coupons of competing products, and displays them on the device screen, thereby, the coupon function automatically provides for the user an efficient one step interface for access, search, and delivery of coupons by product code to the user wireless mobile device from the coupon server.

The coupon function stores the received coupons in the temporary memory of the device and displays the coupons to the device user for selection of one or more coupons for permanent memory storage in the device for access there from for subsequent redemption form a retail merchant.

The coupon function organizes a display of received coupons in the device in the sequence of the specific product coupon, competing product coupons, and best value coupon. The coupon function displays for each coupon, a relative consumer ranking of each competing product next to the coupon data, the ranking received along with the coupon data from the coupon server, enabling a user to judge the relative value of a competing product coupon.

There are customer selectable search queries from one of a (i) specific product only, (ii) specific and competing products coupons and best coupon value of any product in the competing products.

An electronic coupon system on a global computer network has a coupon server that has a database server and associated processors and logic. The database server maintains a coupon database organized by (i) product codes and for each product a list of available coupons, and (ii) competing products and for each such competing product a list of available coupons. The server receives a coupon search query from only a mobile wireless device of a customer, for a specific product code and searches the coupon database and finds coupons by product code and sends to the wireless device.

The coupon database also stores a relative consumer ranking and manufacture quality ranking for each product.

The server has a best value coupon search logic that searches the database and finds best value coupon among the specific product and competing products. The best coupon value search logic organizes the search result in categories of coupons by specific product coupon, coupons from competing products and a product with best value coupon. The best value coupon logic compares coupon data from competing products and organizes coupons by specific product coupon and relative ranking, up to four competing product coupons and their relative ranking, and best value coupon among these coupons.

There is in the server a server logic that creates a record of each search query and response for use in creating a statistical chart for analysis by product codes. The server logic creates periodic statistical data charts by product code for delivery to businesses.

An electronic coupon system on a global computer network has a coupon server that has a database server and associated processors and logic. The database server maintains a coupon database organized by (i) product codes and for each product a list of available coupons, and (ii) competing products and for each such product a list of available coupons. There is a mobile wireless device of the customer equipped with a reader element to read product codes from product packages in a retail store and a coupon function in the device, operative in the device, the function when user activated in the device, receives a product code read from a product, stores the product code in a temporary memory of the device.

The coupon function without further user interaction automatically forms one of a plurality of search queries for a product coupon for the specific product code and wirelessly sends the query with the product code to the coupon server accessible on the global computer network. The server receives a coupon search query from only a mobile wireless device, for a specific product code and searches the coupon database and finds coupon by product code and sends to the wireless device, thereby system provides a one-step user interface to the coupon system.

The coupon function then receives in return response from the coupon server to include any available coupons for the product and any coupons of competing products and the coupon function displays them on the device screen, thereby, the coupon function automatically provides for the user an efficient one step interface for access, search, and delivery of coupons by product code to the user wireless mobile device from the coupon server.

There is a best value coupon logic operative in the server compares coupon data from competing products and organizes coupons by specific product coupon and relative ranking, up to four competing product coupons and their relative ranking, and best value coupon among these coupons.

FIG. 12 illustrates a method diagram for this embodiment of the electronic coupon system. The method for electronic coupon system on a global computer network has the steps where all the steps may not be used or used in the order specified:

At step 185, having a coupon server with a database server and maintaining by the database server a coupon database organized by (i) product codes and for each product a list of available coupons, and (ii) competing products and for each such product a list of available coupons.

At step 186, enabling using a mobile wireless device equipped with a reader element and reading product codes from product packages in a retail store and receiving the product code in a coupon function operative in the device and storing the product code in a temporary memory of the device.

At step 187, forming automatically one of a plurality of search queries for a product coupon for the specific product code, by the coupon function, without further user interaction and wirelessly sending the query with the product code to the coupon server accessible on the global computer network.

At step 188, receiving, by the server a coupon, search query from only a mobile wireless device, for a specific product code and searching the coupon database and finding available coupons by product code and sending to the wireless device, thereby the system providing a one-step user interface to the coupon system.

At step 189, receiving, by the coupon function, then, in return response from the coupon server including any available coupons for the product and any coupons of competing products.

At step 190, displaying, by the coupon function, coupon data on the screen of the device. The coupon function automatically providing for the user an efficient one step interface for access, search, and delivery of coupons by product code to the user wireless mobile device from the coupon server.

At step 191, organizing, by the coupon function, the display of the received coupons in the device in the sequence of specific product coupon, competing product coupon, and best value coupon.

At step 192, displaying by the coupon function for each coupon, a relative consumer ranking of each competing product next to the coupon data, the ranking received along with the coupon data from the coupon server, enabling a user to judge the relative value of a competing product coupon.

At step 193, comparing, by a best value coupon logic, coupon data from competing products and organizing coupons by specific product coupon and relative ranking, up to four competing product coupons and their relative ranking, and best value coupon among these coupons.

At step 194, creating a record by a server logic for each search query and response for use in creating a statistical chart for analysis by product codes and creating by the server logic periodic statistical data charts by product code for delivery to businesses.

In summary, the preferred embodiment of the electronic coupon delivery and redemption system 10 provides for delivery of product coupons 20 of the product merchants 28 to customers wireless mobile devices 14. The preferred embodiment provides for coupon redemptions by retail merchants 16 by scanning the coupon bar code 22 from the wireless device 14 screen and to validate the coupon for one time use by interfacing of the retail merchant system 16 with the coupon server 12. The preferred embodiment provides for the product merchant to receive coupon redemption data from the coupon server 12 and to facilitate payment to the retail merchant aggregate funds for the redeemed funds via the coupon system 12. Thus, the preferred embodiment of the electronic coupon system 10 provides an efficient, versatile, and convenient paperless coupon system.

In another preferred embodiment for access of coupons from the electronic coupon system, a mobile wireless device 14 of the customer that is equipped with a reader 124 to read product bar code 126 from products 128 in a retail store and a coupon function 122 in the device is used. The coupon function 122 is used to search and retrieve product coupons in a single step by scanning the product code on product packaging to access coupons for all available competing products and display coupon data 130 using a single step function in the device.

While the particular invention, as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

What is claimed:

1. A system for electronic coupons for a customer on a global computer network, the system comprising:

a coupon logic operating within a mobile wireless device of the customer, wherein the mobile wireless device has a CPU, a memory, an optical reader configured for reading a bar code, wherein the optical reader is in the form of a digital camera and a logic in the mobile wirelessdevice that converts the bar code into a digital string of data, from a package of a product and the coupon logic operative in the memory and the processor of the device;

the mobile wireless device is configured to connect to a server on a global computer network using http protocol which provides a return address of the device that embeds a wireless device id and an identification of a wireless company as a service provider, wherein, the mobile wireless device wirelessly connects to the server on the global computer network, for receiving a response to the mobile wireless device from the server;

the coupon logic communicating with a coupon server with a database server with a coupon database, wherein the coupon database has pre-stored electronic coupons of at least multiple merchants, wherein each coupon has at least a coupon code;

the coupon logic when customer activated, provides the customer with two search options: manually searching product categories, or reading the product bar code from the package of the product via the optical reader, wherein the coupon logic stores the product bar code in a temporary memory of the device;

the coupon logic, without further customer interaction, automatically forms, using the product bar code, one of a pre-selected plurality of search queries of (i) a specific product only, (ii) or specific and competing products coupons with best coupon value rankings of any product in the competing products, wherein the device then wirelessly transmits the search query to the coupon server enabling the coupon server to search for and retrieve any available coupons from the coupon database and return the available coupons in a file, wherein coupon server has embedded the coupon code of each coupon with the wireless device id of the mobile device, from the return address;

the coupon logic receives from the coupon server, based on the search query either (i) coupons for the specific product only or (ii) the coupons from competing products including best coupon value ranking among competing products, and wherein the coupon server pre-stores in the coupon database coupons with their best coupon value rankings from a plurality of product merchants referenced by the product bar codes, and wherein the best coupon value ranking is determined based on consumer ranking, product price, manufacture quality ranking, and coupon discount of the competing products;

the coupon logic receives multiple electronic coupons in a file with the wireless device id of the mobile wireless device embedded in a coupon code of each of the electronic coupons; and the coupon logic stores the multiple received coupons in the temporary memory of the device and displays the multiple received coupons to the customer, wherein the coupon logic also displays a user interface button for each displayed coupon that permanently saves a corresponding coupon when selected by the customer, wherein the displayed multiple received coupons and corresponding user interface buttons are all displayed at the same time on the mobile wireless device.

2. The system of claim 1, comprising:
the coupon logic then receives in return response from the coupon server to include any available coupons for the product and any coupons of competing products, and displays them on the device screen, thereby, the coupon logic automatically provides for the customer a one step interface for access, search, and delivery of coupons by product code to the mobile wireless device from the coupon server, wherein the coupon server validates the coupon code in real time and prevents the coupon code from being used twice by the mobile wireless device.

3. The system of claim 1, comprising:
the coupon logic organizes a display of received coupons in the device in the sequence of the specific product coupon, competing product coupons, and best coupon value ranking;
the coupon logic displays for each coupon, a relative consumer ranking of each competing product next to the coupon data, the ranking received along with the coupon data from the coupon server, enabling the customer to judge the relative value of a competing product coupon; and
the coupon logic displays, for each competing product coupon, a user interface button that permanently saves the competing product coupon when selected by the user, and a user interface button that discards the competing product coupon when selected by the user.

4. The system of claim 1, wherein the coupon server further:
receives coupon redemption data, including the wireless device id embedded in a redeemed coupon, from a retail merchant;
stores the coupon redemption data in the coupon database; and
compiles statistical data, including search queries for the specific product and coupon redemption data, in real time.

5. An electronic coupon system on a global computer network, comprising:
a coupon logic communicating with a coupon server having a coupon database and associated processors and a coupon-server logic operative in the processors and the database is organized by (i) product codes and for each product a list of available coupons, and (ii) competing products and for each such product a list of available coupons;
the coupon logic operating within a mobile wireless device having a reader element, in the form of a digital camera with associated logic, to read product codes from product packages, and has a CPU, a memory and a coupon logic in the memory of the device, operative in the device, the logic when user activated in the device, receives a product code read from a product, stores the product code in a temporary memory of the device;
the coupon logic without further user interaction automatically forms using the product code one of a preselected plurality of coupon search queries of (i) a specific product only, (ii) or specific and competing products coupons and best coupon value ranking of any product in the competing products for a product coupon for the specific product code and wirelessly sends the query with the product code to the coupon server and the coupon logic identifies the user to the coupon server via only a return address of the mobile wireless device that uses a wireless device id and the identification of a wireless company as a service provider, wherein the best coupon value is determined based on consumer ranking, product price, manufacture quality ranking, and coupon discount of the competing products;
the coupon server receives the coupon search query from only the mobile wireless device, for the specific product code and searches the coupon database and finds coupon by product code and transmits to the coupon logic, multiple coupons with the wireless device id embedded in a coupon code, thereby providing a one-step user interface to the coupon system, wherein the coupon server validates the coupon code in real time and prevents the coupon code from being used twice by the mobile wireless device; and
the coupon logic stores the multiple coupons in the temporary memory of the device and displays the multiple coupons to the user, wherein the coupon logic also displays a user interface button for each displayed coupon that permanently saves a corresponding coupon when selected by the user, wherein the displayed multiple coupons and corresponding user interface buttons are all displayed at the same time on the mobile wireless device.

6. The system of claim 5, comprising:
coupon logic then receives in return response from the coupon server to include any available coupons for the product and any coupons of competing products;
the coupon logic displays them on the device screen, thereby, the coupon logic automatically provides for the user an efficient one step interface for access, search, and delivery of coupons by product code to the mobile wireless device from the coupon server; and
the coupon logic displays, for each competing product coupon, a user interface button that permanently saves the competing product coupon when selected by the user, and a user interface button that discards the competing product coupon when selected by the user.

7. The system of claim 6, comprising:
a best value coupon logic operative in the server compares coupon data from competing products and organizes coupons by specific product coupon and relative ranking, up to four competing product coupons and their relative ranking, and best coupon value ranking among these coupons.

8. The system of claim 5, comprising:
a server logic creates a record of each search query and response and stores the record of each search query and response in the coupon database;
the server logic creates a record of coupon redemption data, including product codes and the wireless id embedded in a redeemed coupon, and stores the record of coupon redemption data; and
the server logic compiles and stores statistical data including a frequency of the search query and response and a frequency of coupon redemptions in real time.

9. A method for electronic coupon system on a global computer network, comprising the steps of:
providing a coupon server with a coupon database and maintaining by the coupon database (i) product codes and for each product a list of available coupons, and (ii) competing products and for each such product a list of available coupons;
enabling using by a user a mobile wireless device equipped with a reader element, wherein the reader element is a digital camera with associated logic, for reading product codes from product packages and receiving the product code in a coupon logic operative in the device and storing the product code in a temporary memory of the device;

forming automatically by the coupon logic one of a plurality of search queries for a product coupon for the specific product code, by the coupon logic, without further user interaction and wirelessly sending the query with the product code to the coupon server and identifying the user to the coupon server via only a return address of the mobile wireless device that uses a wireless device id and the identification of a wireless company as a service provider;

receiving by the coupon server a coupon search query from only a mobile wireless device, fora specific product code and searching the coupon database and finding available coupons by product code and transmitting, to the mobile wireless device, multiple coupons with the wireless device id embedded in a coupon code, and sending to the wireless device, thereby the system providing a one-step userinterface to the coupon system, wherein the coupon server determines the best coupon value ranking using consumer ranking, product price, and coupon discount of the competing products; and storing, by the device, the multiple coupons in the temporary memory of the device and displaying the multiple coupons to the user, the device also displaying a user interface button for each displayed coupon that permanently saves a corresponding coupon when selected by the user, wherein the displayed multiple coupons and corresponding user interface buttons are all displayed at the same time on the mobile wireless device.

10. The method of claim 9, comprising the steps of:
receiving by the coupon logic, in return response from the coupon server any available coupons for the product and any coupons of competing products; and
displaying by the coupon logic on a device screen thereby, providing automatically by the coupon logic for the user a one step interface for access, search, and delivery of coupons by product code to the user wireless mobile device from the coupon server.

11. The method of claim 10, comprising the steps of:
organizing by the coupon logic the display of the received coupons in the device in the sequence of specific product coupon, competing product coupon, and the best coupon value ranking;
displaying by the coupon logic for each coupon, a relative consumer ranking of each competing product next to the coupon data, the ranking received along with the coupon data from the coupon server, enabling a user to judge the relative value of a competing product coupon; and
displaying by the coupon logic, for each competing product coupon, a user interface button that permanently saves the competing product coupon when selected by the user, and a user interface button that discards the competing product coupon when selected by the user.

12. The method of claim 10, comprising the steps of:
comparing, by a best value coupon logic, coupon data from competing products and organizing coupons by specific product coupon, relative ranking, and the best coupon value ranking among the coupons being organized.

13. The method of claim 10, comprising the steps of:
creating a record by a server logic for each search query and response for use in creating a statistical chart for analysis by product codes;
the coupon server receiving a coupon redemption data, including the wireless device id embedded in a redeemed coupon;
creating a record by the server logic of the coupon redemption data, including the product codes and wireless device id embedded in a redeemed coupon, and storing the record of coupon redemption data; and
creating by the server logic periodic statistical data charts by product code, including a frequency of the search query and response and a frequency of coupon redemptions in real time.

14. An Electronic Coupon System (ECS), comprising: a database server with an ECS logic operating therein;
interfaces to a global computer network, including at least one interface with a plurality of advertising merchants, wherein the at least one interface is used to openan account in the ECS and enter electronic coupons in the database server for distribution therefrom by the ECS to customers;
the interfaces include an interface exclusively used with cell phones of customers, operating in a wireless network, wherein the ECS logic retrieves a wireless device id from one of the cell phones, wherein the interface exclusively used with cell phones provides customers with two search options: manually searching product categories, or reading a product bar code from the package of the product via a cell phone camera; and
the ECS logic embeds the wireless device id in the electronic coupons to be delivered to said one of the cell phones, wherein the electronic coupons to be delivered to said one of the cell phones include coupons for competing products, and wherein the interface exclusively used with cell phones of customers displays the electronic coupons and electronic coupons for competing products and best coupon value ranking of any product in the competing products, wherein the best coupon value ranking is determined based on consumer ranking, product price, manufacture quality ranking, and coupon discount of the competing products.

15. The ECS of claim 14, further comprising:
the ECS logic uses distribution of electronic coupons to cell phones of the customers and coupon redemption data to generate business reports on an aggregate basis in real time, the business reports including data on electronic coupon distribution to customers and their coupon redemption data at retail merchants.

16. The system of claim 14, wherein the interface exclusively used with cell phones of customers displays, for each electronic coupon for competing products, a user interface button that permanently saves the competing product coupon when selected by the user, and a user interface button that discards the competing product coupon when selected by the user.

17. A system for electronic coupons fora customer on a global computer network, the system comprising:
a coupon server with a database server with a coupon database, wherein the coupon database has pre-stored electronic coupons of at least multiple merchants, wherein each coupon has at least a coupon code that identifies one of the merchants;
the system provides access to the coupon server via a mobile wireless device, wherein the mobile wireless device is configured to connect to the coupon server on a global computer network using http protocol which provides a return address of the device that embeds a wireless device id and an identification of a wireless company as a service provider; and the coupon server receives from the mobile wireless device requests for electronic coupons, wherein the coupon server embeds the wireless device id into the coupon code and sends electronic coupons with the coupon code embedded with the mobile wireless device id to the mobile wireless device, and wherein a best coupon value ranking is determined using consumer ranking, product price, and coupon discount of the competing products.

18. The system of claim 17, further comprising:

the coupon server receives from a retail merchant coupon redemption data, including the wireless device id embedded in the coupon code, and stores the coupon redemption data in the coupon database.

19. The system of claim 18, further comprising:

the coupon server compiles coupon redemption statistical data for individual merchants for providing to the individual merchants.

20. The system of claim 19, further comprising:

the coupon server receives requests from individual merchants to provide individual merchants the coupon redemption statistical data.

* * * * *